United States Patent
Dablo

(10) Patent No.: US 7,242,108 B1
(45) Date of Patent: Jul. 10, 2007

(54) WIND-ACTUATED ELECTRIC POWER ALTERNATOR

(76) Inventor: Oliver P. Dablo, 7754 Devonshire Ct., Las Vegas, NV (US) 89139

( * ) Notice: Subject to any disclaimer, the term of this patent is extended or adjusted under 35 U.S.C. 154(b) by 61 days.

(21) Appl. No.: 11/260,917

(22) Filed: Oct. 27, 2005

(51) Int. Cl.
*F03D 3/04* (2006.01)
*H02P 9/00* (2006.01)

(52) U.S. Cl. .......................... 290/55; 290/44; 415/4.2; 415/4.4

(58) Field of Classification Search .............. 290/43, 290/44, 54, 55; 415/1, 4.2, 4.4; 60/398
See application file for complete search history.

(56) References Cited

U.S. PATENT DOCUMENTS

| | | | | |
|---|---|---|---|---|
| 4,039,849 A | * | 8/1977 | Mater et al. ................. | 290/55 |
| 4,486,143 A | * | 12/1984 | McVey ....................... | 414/164 |
| 4,551,631 A | * | 11/1985 | Trigilio ....................... | 290/55 |
| 4,834,610 A | * | 5/1989 | Bond, III ................... | 415/53.3 |
| 5,391,926 A | * | 2/1995 | Staley et al. ................. | 290/55 |
| 5,852,331 A | * | 12/1998 | Giorgini ...................... | 290/55 |
| 6,191,496 B1 | * | 2/2001 | Elder ........................ | 290/55 |
| 6,710,469 B2 | * | 3/2004 | McDavid, Jr. ............... | 290/55 |
| 6,740,989 B2 | * | 5/2004 | Rowe ......................... | 290/55 |
| 6,841,894 B2 | * | 1/2005 | Gomez Gomar ............ | 290/55 |
| 6,966,747 B2 | * | 11/2005 | Taylor et al. ................. | 415/1 |
| 6,984,899 B1 | * | 1/2006 | Rice ........................... | 290/44 |

\* cited by examiner

*Primary Examiner*—Nicholas Ponomarenko

(57) ABSTRACT

A wind-actuated electric power alternator is disclosed. The wind-actuated electric power alternator includes an impeller enclosure having a generally triangular cross-sectional configuration. An impeller is rotatably mounted in the impeller enclosure. An alternator is coupled to the impeller for generating electricity responsive to wind-blown rotation of the impeller in the impeller enclosure.

20 Claims, 2 Drawing Sheets

WIND-ACTUATED ELECTRIC POWER ALTERNATOR

FIELD OF THE INVENTION

The present invention relates to apparatus for generating energy. More particularly, the present invention relates to a wind-actuated electric power alternator which is environmentally-friendly and efficient.

BACKGROUND OF THE INVENTION

Various types of wind-actuated power alternators are known in the art for converting wind power into electrical power. However, many conventional wind-actuated power alternators have a complex design which renders the alternators inefficient. Furthermore, many conventional wind-actuated power alternators have unenclosed rotating blades which can be harmful to wildlife. Therefore, a wind-actuated electrical power alternator is needed which is efficient, environmentally-friendly and does not pose a danger to wildlife.

SUMMARY OF THE INVENTION

The present invention is generally directed to a wind-actuated electric power alternator which is efficient, environmentally-friendly and does not pose a danger to wildlife. The wind-actuated electric power alternator includes an impeller enclosure having a generally triangular cross-sectional configuration. An impeller is rotatably mounted in the impeller enclosure. A alternator is coupled to the impeller for generating electricity responsive to wind-blown rotation of the impeller in the impeller enclosure.

BRIEF DESCRIPTION OF THE DRAWINGS

The invention will now be described, by way of example, with reference to the accompanying drawings, in which.

DETAILED DESCRIPTION OF THE INVENTION

Figure 3:
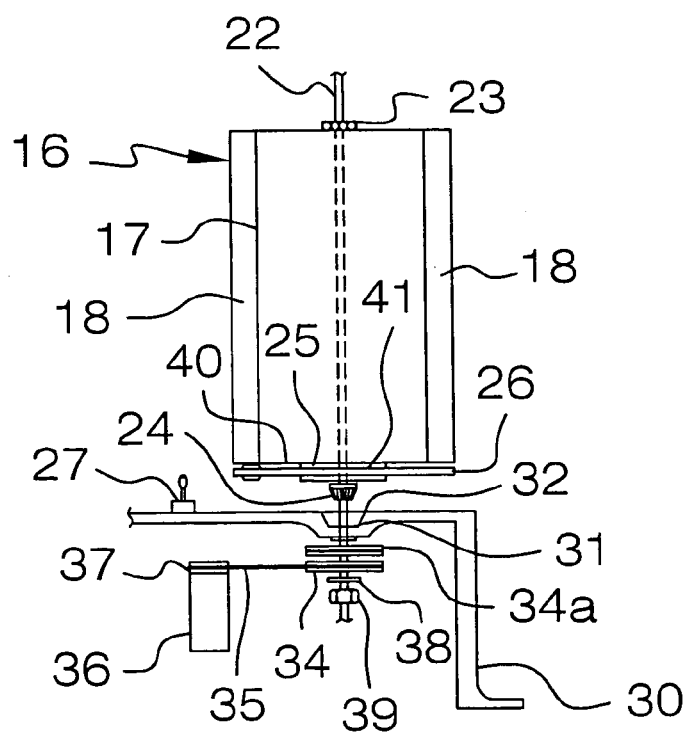
FIG. 3 is a side view of the impeller, illustrating a typical belt arrangement for connecting the impeller to the electrical alternator.

Referring to the drawings, an illustrative embodiment of the wind-actuated electric power alternator according to the present invention is generally indicated by reference numeral 1. The wind-actuated electric power alternator 1 typically includes a base 2 which may have a generally triangular cross-sectional configuration. The base 2 includes multiple, generally planar base sides 3 which are connected at acute angles with respect to each other at multiple base corners 3a. Preferably, the base 2 has the configuration of an equilateral triangle, with the base sides 3 having substantially the same length. The base sides 3 together define a base interior 5, as shown in FIG. 3. A base flange 4 may be provided along the bottom edge of the base 2 to facilitate mounting the base 2 to a flat support surface (not shown).

Figure 1:
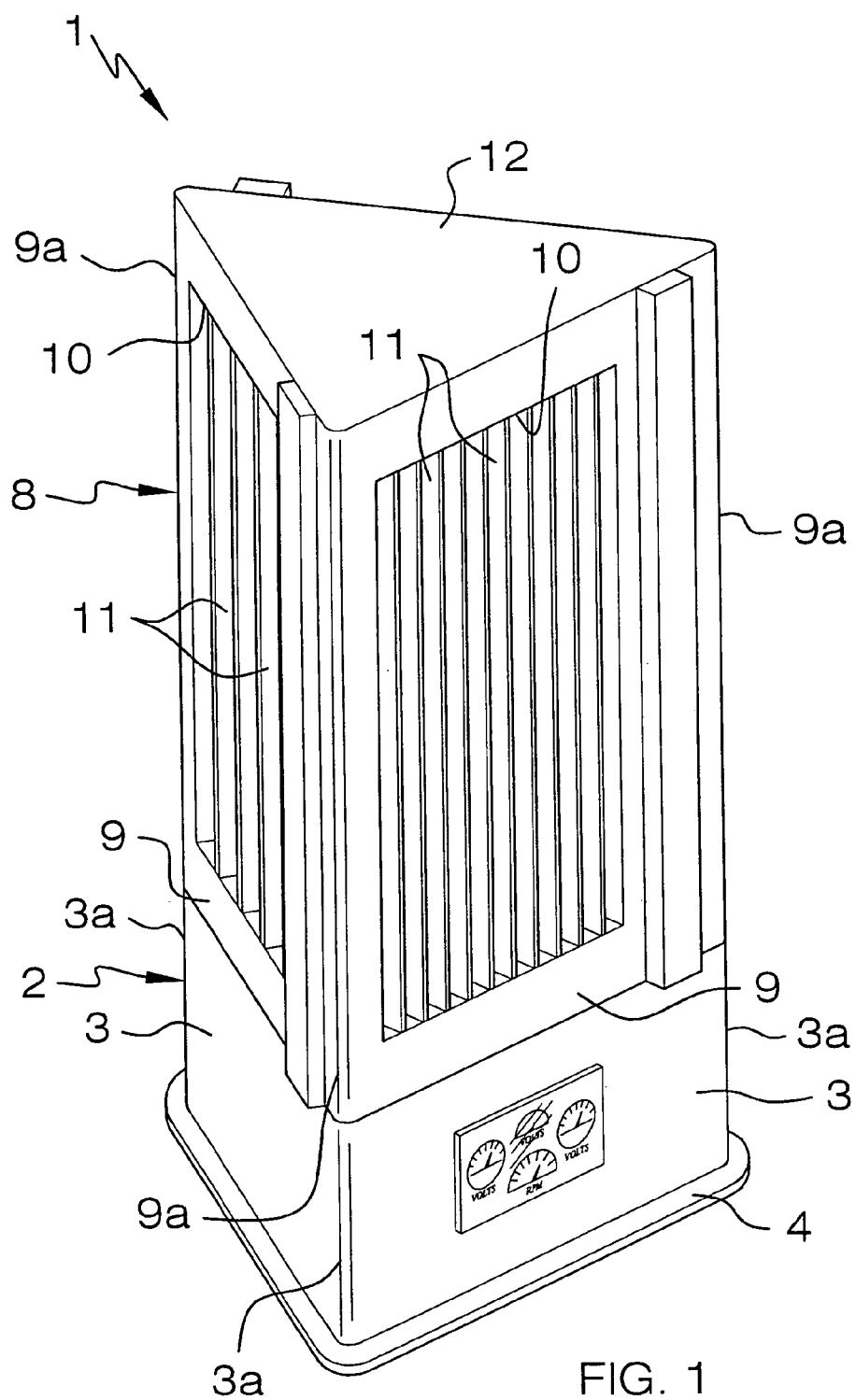
FIG. 1 is a perspective view of an illustrative embodiment of the wind-actuated electric power alternator according to the present invention.
Figure 2:
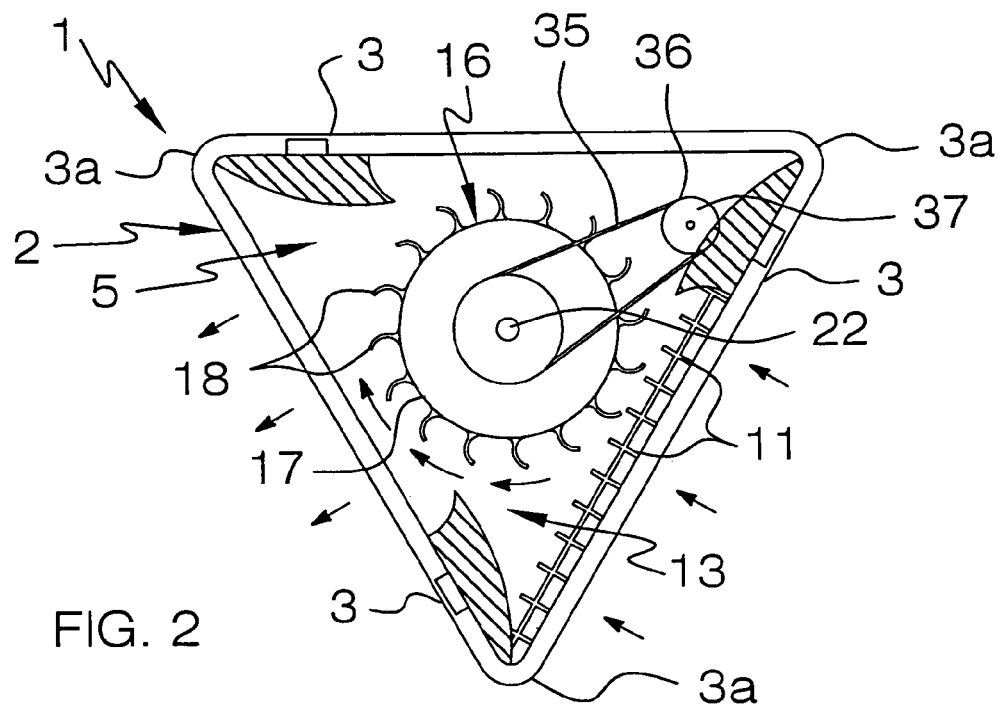
FIG. 2 is a cross-sectional view of the wind-actuated electric power alternator, illustrating an impeller and electric alternator provided in an enclosure of the alternator.

An impeller enclosure 8 is provided on the base 2. The impeller enclosure 8 has a cross-sectional configuration which generally matches that of the base 2 and includes multiple enclosure panels 9 which are connected to each other at acute angles with respect to each other at multiple enclosure corners 9a. An enclosure top 12 is provided on the upper ends of the enclosure panels 9. The enclosure panels 9 and enclosure top 12 together define an enclosure interior 13, as shown in FIG. 2. The enclosure interior 13 of the impeller enclosure 8 communicates with the base interior 5 of the base 2.

A panel opening 10 extends through each enclosure panel 9 and communicates with the enclosure interior 13. Preferably, each panel opening 10 has a generally elongated, rectangular configuration. Multiple louvers 11 typically span each panel opening 10 in a generally vertical configuration. Preferably, the louvers 11 are adjustably mounted in each panel opening 10 in such a manner that the louvers 11 can be selectively angled between an open configuration, as shown in FIG. 2, and a closed position (not shown). The louvers 11 are adjustable independently with respect to each other.

An impeller mount frame 30 is provided in the base interior 5 of the base 2. A bearing seat 32 is provided in the upper surface of the impeller mount frame 30, and a roller bearing 24 is seated in the bearing seat 32. A shaft opening 31 extends through the roller bearing 24 and the impeller mount frame 30. An impeller shaft 22 extends through the shaft opening 31. Accordingly, the impeller shaft 22 freely rotates in the roller bearing 24 and extends both above and beneath the impeller mount frame 30. An impeller 16 is provided on the impeller shaft 22, above the impeller mount frame 30, and is oriented in a generally vertical configuration in the enclosure interior 13.

The impeller 16 typically includes a generally elongated, cylindrical impeller body 17. Multiple impeller blades 18 extend outwardly from the exterior surface of the impeller body 17, in spaced-apart relationship to each other around the circumference of the impeller body 17. The impeller blades 18 may be elongated and traverse substantially the entire vertical extent or length of the impeller body 17, or alternatively, may traverse a portion of the vertical extent or length of the impeller body 17. Preferably, the impeller blades 18 have a generally curved cross-sectional configuration, as shown in FIG. 2, and extend outwardly in a generally arcuate path from the impeller body 17, into the enclosure interior 13.

The impeller 16 may be mounted on the impeller shaft 22 using any suitable technique which is known by those skilled in the art. For example, the impeller body 17 may be attached to a bearing 23 which is mounted on the impeller shaft 22. Preferably, a flywheel 26 is mounted on the shaft 22 beneath the impeller 16, and the shaft 22 normally rotates freely with the flywheel 26. A spacer 25 may be provided between the flywheel 26 and the lower end of the impeller body 17 and also between the flywheel 26 and the roller bearing 24. A brake 27, which may be hydraulic, for example, is provided on the impeller mount frame 30 and engages the flywheel 26. The brake 27 is actuated by a typically manual brake control mechanism (not shown). Accordingly, through actuation of the brake control mechanism (not shown), the brake 27 grabs the flywheel 26 against disk brakes 41 which are bolted or otherwise attached to a base plate 40 provided on the impeller body 17. Thus, the brake 27 transfers energy from the flywheel 26 to the base plate 40 to selectively prevent rotation of the impeller 16 and the impeller shaft 22. The flywheel 26 and brake 27 can be selectively disengaged from the disk brakes 41 and base plate 40, through release of the brake control mechanism, to again facilitate rotation of the impeller 16 and the impeller shaft 22.

A pulley wheel 34 is mounted on the impeller shaft 22, beneath the impeller mount frame 30. The pulley wheel 34 may be secured on the impeller shaft 22 using a washer 38 and securing nut 39, for example. An electric alternator 36, having a alternator drive wheel 37, is mounted in the base interior 5, beneath the impeller mount frame 30. A alternator drive belt 35 connects the pulley wheel 34 to the alternator drive wheel 37 of the alternator 36. Accordingly, the alternator drive belt 35 is operable to transmit rotation from the impeller shaft 22 to the alternator drive wheel 37 of the alternator 36, thereby driving the alternator 36. A second pulley wheel 34a may be likewise provided on the impeller shaft 22, above or below the pulley wheel 34, and connected to a second alternator (not shown) in like manner. An instrument panel (not shown) may be provided on the exterior surface of the base 2 or impeller enclosure 8, for example, and may include, for example, an RPM gauge which indicates the rotational speed of the impeller shaft 22 as well as at least one voltmeter which indicates the voltage of each alternator 36.

In typical operation of the wind-actuated electric power alternator 1, the louvers 11 on the enclosure panels 9 of the impeller enclosure 8 are positioned in an open configuration to facilitate the flow of wind through one set of louvers 11, through the enclosure interior 13 and out another set of louvers 11, as shown in FIG. 2. The wind blows against the typically curved impeller blades 18, thus causing the impeller 16 to rotate in the clockwise direction as indicated by the arrows in FIG. 2. The impeller 16 transmits rotation to the impeller shaft 22 through the bearing 23. The impeller shaft 22, in turn, transmits rotation to the pulley wheel 34, which rotates the alternator drive wheel 37 of the alternator 36 through the alternator drive belt 35. The alternator 36 generates electrical power, which may be stored in a suitable electrical storage device (not shown) for later use or may be used to power electronic components of any machine or device (not shown) simultaneously. The pulley wheel 34 may be adapted to rotate the alternator drive wheel 37 through the alternator drive belt 35 only when the impeller shaft 22 reaches a threshold rotational speed, such as, for example, 5 rpm, or when the wind speed reaches a predetermined magnitude, such as, for example, 10 mph.

When operation of the wind-actuated electric power alternator 1 is not desired, rotation of the impeller 16 and impeller shaft 22 in the enclosure interior 13 can be stopped by actuation of the brake 27 and flywheel 26, as was noted hereinabove. Additionally or alternatively, the louvers 11 on the enclosure panels 9 can be closed to prevent the flow of wind into the enclosure interior 13. Additionally or alternatively, the pulley wheel 34 may be adapted to rotatably disengage the alternator drive wheel 37 when the rotational speed of the impeller shaft 22 drops below the threshold rotational speed or when the wind speed drops below the predetermined magnitude.

In an illustrative method of assembly of the wind-actuated electric alternator 1, the base plate assembly is constructed. The impeller mount frame 30 is installed typically on a concrete surface (not shown). The roller bearing 24 is seated in the bearing seat 32, the impeller shaft 22 is inserted through the roller bearing 24 and the alternator or alternators 36 is/are connected to the impeller shaft 22. The impeller shaft 22 may be adapted to rotatably engage the alternator 36 when the rotational speed of the impeller shaft 22 reaches a predetermined magnitude, such as, for example, 5 RPM, or when the wind speed reaches a predetermined value, such as, for example, 10 mph. Next, straps (not shown) are attached to the impeller mount frame 30 and extended upwardly. The brake 27 is also installed on the impeller mount frame 30. Next, the flywheel 26, impeller 16 and disk brakes 41 are installed on the impeller shaft 22. The straps (not shown) are attached to the impeller mount frame typically using hex bolts. The base 2 and impeller enclosure 8 are then installed around the impeller mount frame 30 and impeller 16, and the louvers 11 are provided in the impeller enclosure 8.

While the preferred embodiments of the invention have been described above, it will be recognized and understood that various modifications can be made in the invention and the appended claims are intended to cover all such modifications which may fall within the spirit and scope of the invention.

What is claimed is:

1. A wind-actuated electric power alternator, comprising:
    an impeller enclosure having a generally triangular cross-sectional configuration;
    an impeller rotatably mounted in said impeller enclosure; and
    a alternator coupled to said impeller.

2. The wind-powered electric power alternator of claim 1 wherein said impeller enclosure has a generally equilateral triangular configuration.

3. The wind-powered electric power alternator of claim 1 further comprising a base and wherein said impeller enclosure is carried by said base.

4. The wind-powered electric power alternator of claim 1 wherein said impeller comprises an impeller shaft coupled to said alternator, an impeller body carried by said impeller shaft and a plurality of impeller blades and a base plate carried by said impeller body.

5. The wind-powered electric power alternator of claim 4 wherein said plurality of impeller blades each has a generally curved cross-sectional configuration.

6. The wind-powered electric power alternator of claim 4 further comprising a pulley wheel carried by said impeller shaft, a alternator drive wheel carried by said alternator and a alternator drive belt coupling said pulley wheel to said alternator drive wheel.

7. The wind-powered electric power alternator of claim 4 further comprising a flywheel carried by said impeller shaft, disk brakes engaging said base plate and a brake engaging said flywheel for selectively grabbing said flywheel against said disk brakes.

8. The wind-powered electric power alternator of claim 4 further comprising an impeller mount frame provided in said impeller enclosure and wherein said impeller shaft is rotatably mounted in said impeller mount frame.

9. A wind-actuated electric power alternator, comprising:
    an impeller enclosure having a plurality of enclosure panels defining generally triangular cross-sectional configuration;
    a panel opening provided in each of said plurality of enclosure panels;
    an impeller rotatably mounted in said impeller enclosure; and
    a alternator adapted to be coupled to said impeller when said impeller reaches a predetermined rotational speed.

10. The wind-actuated electric power alternator of claim 9 wherein said impeller enclosure has a generally equilateral triangular configuration.

11. The wind-powered electric power alternator of claim 1 further comprising a base having a generally triangular cross-sectional configuration and wherein said impeller enclosure is carried by said base.

12. The wind-powered electric power alternator of claim 9 wherein said impeller comprises an impeller shaft coupled to said alternator, a generally cylindrical impeller body carried by said impeller shaft and a plurality of elongated impeller blades carried by said impeller body.

13. The wind-powered electric power alternator of claim 12 wherein said plurality of impeller blades each has a generally curved cross-sectional configuration.

14. The wind-powered electric power alternator of claim 12 further comprising a pulley wheel carried by said impeller shaft, a alternator drive wheel carried by said alternator and a alternator drive belt coupling said pulley wheel to said alternator drive wheel.

15. The wind-powered electric power alternator of claim 12 further comprising a flywheel carried by said impeller shaft and a brake engaging said flywheel for selectively pushing said flywheel against said impeller body.

16. The wind-powered electric power alternator of claim 12 further comprising an impeller mount frame provided in said impeller enclosure and wherein said impeller shaft is rotatably mounted in said impeller mount frame.

17. A wind-actuated electric power alternator, comprising:
an impeller enclosure having a plurality of enclosure panels defining generally triangular cross-sectional configuration;
a panel opening provided in each of said plurality of enclosure panels;
a plurality of louvers provided in said panel opening;
an impeller rotatably mounted in said impeller enclosure; and
a alternator adapted to be coupled to said impeller when said impeller reaches a predetermined rotational speed.

18. The wind-actuated electric power alternator of claim 17 wherein said impeller comprises an impeller shaft coupled to said alternator; a generally elongated, cylindrical impeller body carried by said impeller shaft; and a plurality of elongated impeller blades carried by said impeller body.

19. The wind-actuated electric power alternator of claim 18 wherein said plurality of impeller blades each has a generally curved cross-sectional configuration.

20. The wind-actuated electric power alternator of claim 18 further comprising a flywheel carried by said impeller shaft and a brake engaging said flywheel for selectively pushing said flywheel against said impeller body.

* * * * *